Sept. 22, 1931.  H. W. MORSE  1,824,360

MANUFACTURE OF BURKEITE

Filed March 30, 1929

Patented Sept. 22, 1931

1,824,360

UNITED STATES PATENT OFFICE

HARRY WHEELER MORSE, OF REDWOOD CITY, CALIFORNIA

MANUFACTURE OF BURKEITE

Application filed March 30, 1929. Serial No. 351,331.

This invention relates to the production of salts from brine, and in particular to the recovery of solid sulfate-carbonate of sodium from Searles Lake brine, the double salt being known as burkeite.

It is an object of my invention to provide a process whereby the aforesaid double salt can be continuously produced from the crude brine.

Another object is to provide a process whereby the double salt will be produced substantially free from admixed impurities, in particular, sodium chloride.

A further object is to provide a process wherein tails salts from a previous operation upon another portion of brine may be utilized.

A further object is to provide a preheater of improved design for raising the brine to the desired temperature.

A still further object is to provide a preheater in which the formation of scale is prevented, and wherein foam is kept down.

Other objects will appear as the description proceeds.

In the following description, I shall refer in particular to that brine widely known as Searles Lake brine. A typical average analysis of this crude material gives substantially the following figures:

| | Per cent |
|---|---|
| $Na_2CO_3$ | 4.75 |
| $Na_2SO_4$ | 6.65 |
| NaCl | 16.00 |
| KCl | 4.75 |
| Borax (anhydrous basis) | 1.70 |

As is well known, the most valuable constituents of this brine are the potassium chloride and the borax. These materials are recovered by evaporating the brine to such a point that the carbonate, sulfate and chloride of sodium crystallize out, whereupon the mother liquor containing the desired products is separated from the solids, usually called tails salts, and the mother liquor is then further evaporated to obtain the potassium chloride and the borax in solid form. The tails salts from this process are frequently discarded as unmarketable, and will have an average analysis about as follows:

| | Per cent |
|---|---|
| $Na_2CO_3$ | 12.5 |
| $Na_2SO_4$ | 21.0 |
| NaCl | 65.0 |

If raw Searles Lake brine is heated without evaporation to a temperature of 90–100° C., with the addition of solid sodium chloride, or of tails salts as above, nearly pure sulfate-carbonate of soda separates in solid form. This double salt may be advantageously used in numerous processes which form no part of the present invention. If a weight of solid tails salts equal to 6–10% of the weight of brine treated is added to the brine, and the mixture heated to 90–100° C. for a time, solid sulfate-carbonate is produced in an amount equal to substantially 6–10% of the weight of the brine.

In carrying out my invention, I may use apparatus which I have illustrated in the accompanying drawings, in which:

Figure 1 is a side elevation, partly in section, of an apparatus adapted to carry out my process; and, Figure 2 is a side elevation of another form of apparatus which may be employed in a modification of my process.

Referring now to Figure 1, I have shown at 10 a preliminary mixer, in which the raw brine and tails salts are commingled. A preheater 12 is provided wherein the mixture is heated, without substantial evaporation, until the double salt has separated. A settler 14 then permits separation of the sluge of crystals from most of the brine. The crystal sludge then passes to a filter 16 where the double salt is sucked as dry as practicable.

Raw brine is fed into the mixer 10 through a feed pipe 18. A hopper 20 permits the introduction of the solid tails salts. The two are mixed as thoroughly as possible, by any desired conventional mechanism, not shown in detail.

From the mixer, the raw material is fed through pipe 22 into the L-shaped conduit 24. One end of this conduit taps into the bottom of chamber 25 of preheater 12; the other end feeds into a circulating pump 26, which discharges into a manifold 28. From this manifold, a number of vertical pipes 30 extend upwardly and open into the chamber 25 of the preheater. A circulating system is thereby provided; liquid being drawn from chamber 25 by pump 26, through conduit 24, and discharged into manifold 28 and pipes 30, to be sprayed back into the chamber. A cylindrical casing 32 surrounds pipes 30, being closed above and below by tube sheets 34, through which the tubes extend. A steam inlet at 35 permits the external heating of tubes 30, and consequently the heating of the brine circulating through these pipes. The condensate outlet is indicated at 36.

The preheater which I have described above is, I have found, especially adapted for use in connection with processes of the type described herein. The small size and vertical arrangement of the tubes 30, coupled with the rapid circulation of the brine and the suspended salts, completely prevents scaling or the formation of an insulating layer of solids on the walls of the tubes.

I have found further that I can prevent foaming by placing a baffle 37 over the discharge ends of the tubes, in such a manner and of such a shape as to form a sheet of liquid extending from the center of the vessel to its wall. The baffle 37 has a surface similar to that formed by revolving a segment of a circle about one of its ends. As the liquid is driven upwardly by pump 26, it impinges against baffle 37, and is spread outwardly in a thin sheet which effectually breaks any foam which may begin to form within the vessel.

A lead-off pipe 38 conducts the heated brine from the preheater 12 to the settling tank 14. This settler may be of any conventional design, and is not illustrated in detail. A draw-off line 40 is provided for removing the liquor; while a return line 42 may be provided, to send back and recirculate a part of the clear liquid, if desired.

The salt which settles out in a sludge in hopper 44 flows into the receiver 46 of the filter. Here it is taken up by suction, in a well known manner, onto the surface of drum 48. The filtrate is led off through pipe 50. A spray 52 may be provided to wash off the residual mother liquid; the wash water being, if desired, separately collected and led off through pipe 54. The dried and washed crystals of sulfate-carbonate of soda are then scraped off at 56, and may be collected as desired.

The tails salts from Searles Lake brine that has been treated as above, give the following typical average analysis:

|  | Per cent |
|---|---|
| $Na_2CO_3$ | 10.0 |
| $Na_2SO_4$ | 13.0 |
| $NaCl$ | 75.0 |

It will be noted, by comparison with the figures given earlier, that a considerable amount of sodium carbonate and sulfate has been reclaimed, and the amount of sodium chloride relatively increased. I may use these tails salts in my mixer 10, or I may use those previously referred to, as produced by the old process. These latter are preferable, being higher in recoverable sodium carbonate and sodium sulfate.

In carrying out my process, brine is fed into mixer 10, and is there mixed with 6–10% its weight of tails salt, either from treated or untreated brine. The mixture is then fed into the preheater 12. The rate of feed to the preheater is slow compared to the circulation maintained in the preheater by pump 26. A rapid circulation prevents overheating and scaling. The feed is so proportioned that liquid will remain in the preheater about 15 minutes, and the steam is regulated to maintain a constant temperature of 90–100° C.

A constant feed of treated sludge is maintained from preheater 12 to settler 14. The size of this settler is chosen so that a practically clear liquid can be drawn off at 40 and 42.

The thickened sludge is then passed to the filter, the double salt filtered off, and, if desired, washed. Typical analyses of the unwashed and washed double salt follows:

*Unwashed*

|  | Per cent |
|---|---|
| $Na_2CO_3$ | 27.0 |
| $Na_2SO_4$ | 65.0 |
| $NaCl$ | 7.0 |

*Washed*

|  | Per cent |
|---|---|
| $Na_2CO_3$ | 29.0 |
| $Na_2SO_4$ | 68.0 |
| $NaCl$ | 2.0 |

The yield of the double salt, when the process is carried out as above is 6–10% of the weight of the brine treated.

In Figure 2 I have shown a slightly modified arrangement. The brine, instead of being led first to a mixer, is discharged directly into a preheater 12', the details of construction of which are the same as of the preheater 12 shown in Figure 1. From the preheater, the brine is fed into an agitator 58, where tails salts are added through opening 60. The mixture then passes into and through agitators 62 and 64, and is eventually discharged into settler 14'. The clear liquid is drawn off through pipe 40', and the sludge passes to filter 16'.

While I have described specific embodi-

I claim:

1. A process for making sulfate-carbonate of soda which comprises heating together a liquid containing chloride, sulfate and carbonate of soda and a solid containing chloride, sulfate and carbonate of soda.

2. A process for making sulfate-carbonate of soda which comprises heating together, with agitation, a liquid containing chloride, sulfate and carbonate of soda and a solid containing chloride, sulfate, and carbonate of soda.

3. A process for making sulfate-carbonate of soda which comprises agitating a heated liquid containing chloride, sulfate and carbonate of soda, together with a solid containing chloride, sulfate and carbonate of soda.

4. A process for making sulfate-carbonate of soda which comprises adding to a brine containing sulfate, carbonate and chloride of sodium, tails salts from another portion of said brine, heating and agitating the mixture until the sulfate-carbonate separates, and separating the solid from the liquid.

5. A process for making sulfate-carbonate of soda from a brine having substantially the composition of Searles Lake brine, comprising adding to said brine tails salts from another portion of said brine, heating and agitating until the sulfate-carbonate of soda separates, and removing the liquid from the crystals.

6. A process for making sulfate-carbonate of soda from a brine having substantially the composition of Searles Lake brine, comprising adding to said brine a solid tails salt comprising sodium sulfate, carbonate and chloride, heating and agitating until the sulfate-carbonate of soda separates, and removing the liquid from the crystals.

7. A process for making sulfate-carbonate of soda from a brine having substantially the composition of Searles Lake brine, comprising adding to said brine 6–10% of its weight of a solid tails salt comprising sodium sulfate, carbonate and chloride, heating and agitating until the sulfate-carbonate of soda separates, and removing the liquid from the crystals.

8. A process for making sulfate-carbonate of soda from a brine having substantially the composition of Searles Lake brine comprising adding to said brine 6–10% of its weight of a solid tails salt comprising sodium sulfate, carbonate and chloride, heating to 90–100° C. until the sulfate-carbonate of soda separates, and removing the liquid.

9. A process for making sulfate-carbonate of soda from a brine containing sulfate, carbonate and chloride of soda, together with other salts, comprising adding to said brine tails salts from the evaporation of another portion of said brine, said other salts being substantially absent from said tails salts, heating and agitating the mixture by rapid recirculation until the sulfate-carbonate of soda separates, continuously removing a portion of the material being treated, and continuously adding fresh material to be treated.

In testimony whereof, I have signed my name to this specification this 28th day of March, 1929.

HARRY WHEELER MORSE.